(12) United States Patent
Akatsuka

(10) Patent No.: US 8,189,949 B2
(45) Date of Patent: May 29, 2012

(54) IMAGE PROCESSING APPARATUS AND IMAGE PROCESSING METHOD

(75) Inventor: Takeshi Akatsuka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1041 days.

(21) Appl. No.: 11/806,967

(22) Filed: Jun. 5, 2007

(65) Prior Publication Data

US 2007/0292045 A1    Dec. 20, 2007

(30) Foreign Application Priority Data

Jun. 12, 2006    (JP) ................ 2006-162443

(51) Int. Cl.
*G06K 9/40* (2006.01)
(52) U.S. Cl. .................. 382/274; 382/264; 382/260
(58) Field of Classification Search .............. 382/274, 382/209, 264, 260
See application file for complete search history.

(56) References Cited

U.S. PATENT DOCUMENTS

| | | | | |
|---|---|---|---|---|
| 5,383,036 | A * | 1/1995 | Mailloux et al. ............ | 358/518 |
| 7,868,913 | B2 * | 1/2011 | Suzuki et al. ............... | 348/148 |
| 7,986,371 | B2 * | 7/2011 | Suzuki et al. ............... | 348/523 |
| 2002/0114513 | A1 * | 8/2002 | Hirao .......................... | 382/167 |
| 2005/0078185 | A1 * | 4/2005 | Suzuki et al. ............... | 348/148 |
| 2006/0038895 | A1 * | 2/2006 | Suzuki et al. ............... | 348/222.1 |
| 2006/0139488 | A1 * | 6/2006 | Suzuki et al. ............... | 348/513 |
| 2006/0197761 | A1 * | 9/2006 | Suzuki et al. ............... | 345/427 |
| 2006/0285938 | A1 * | 12/2006 | Early et al. ..................... | 410/96 |
| 2007/0072154 | A1 * | 3/2007 | Akatsuka et al. ............ | 434/69 |
| 2008/0166056 | A1 * | 7/2008 | Hashimoto et al. .......... | 382/209 |

FOREIGN PATENT DOCUMENTS

| | | | |
|---|---|---|---|
| JP | 8-138043 A | | 5/1996 |
| JP | 08138043 | * | 5/1996 |
| JP | 2000-069354 A | | 3/2000 |
| JP | 2001-245133 A | | 9/2001 |
| JP | 2003-23542 A | | 1/2003 |
| JP | 2003023542 | * | 1/2003 |
| JP | 2006-19928 A | | 1/2006 |
| JP | 2006019928 | * | 1/2006 |

* cited by examiner

*Primary Examiner* — Jayesh A Patel
(74) *Attorney, Agent, or Firm* — Foley & Lardner LLP

(57) ABSTRACT

There are provided with an image area setting unit which causes each pixel included in a photographed photograph-image to be a correction target pixel in order, and sets an image area including the correction target pixel and plural pixels existing near the correction target pixel, a prescribed value calculation processing unit which calculates a prescribed value based on brightness information of pixels included in the image area for every image area which has been set, and a brightness adjusting processing unit which divides a brightness target value of the whole photograph-image by the prescribed value to calculate a correction value, and multiplies the brightness information of the correction target pixel by the correction value to execute a brightness correction processing.

18 Claims, 10 Drawing Sheets

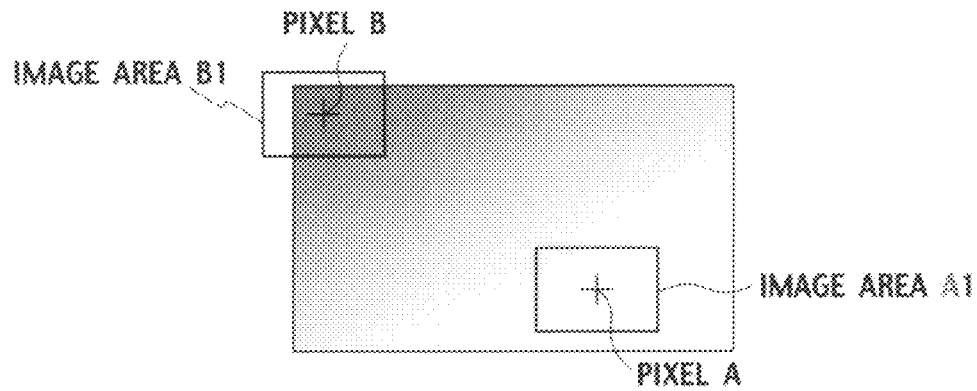
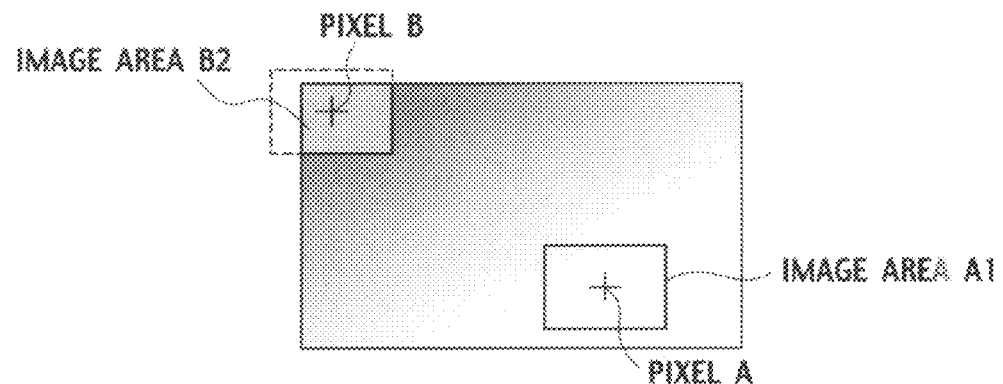
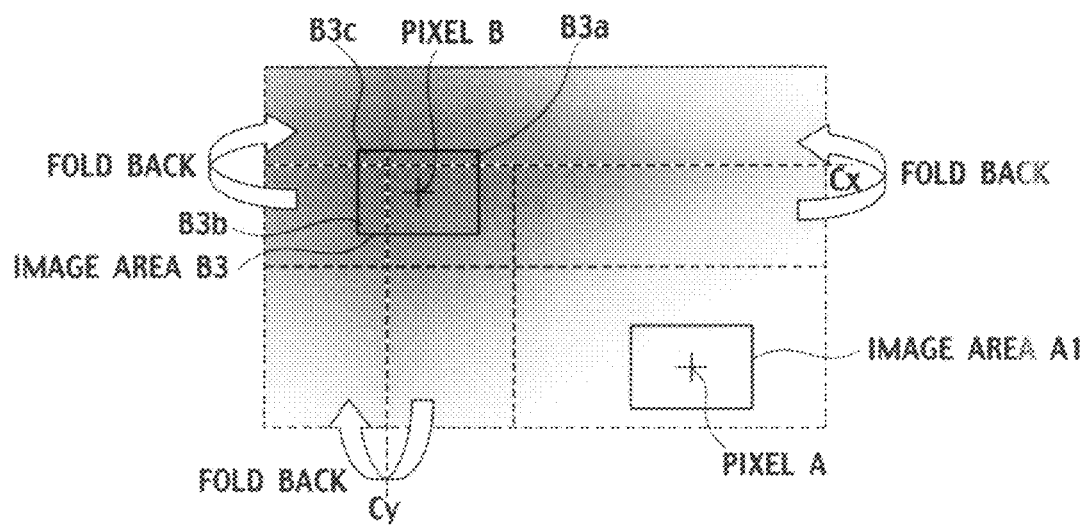

IMAGE PROCESSING APPARATUS AND IMAGE PROCESSING METHOD

BACKGROUND OF THE INVENTION

1. Field of the Invention

The present invention relates to an image processing apparatus and an image processing method which correct the brightness of a photographed photograph-image.

2. Description of the Related Art

The brightness of the photograph-image photographed by a camera apparatus depends on the environment in which a subject is placed, and others, and is greatly affected by the change of photographing conditions such as the ever-changing location and amount of light of a light source, particularly if the photographing is executed in the outdoor environment where the light source is the sunlight.

Therefore, the various approaches for correcting the brightness have been devised to cause a photographed image to be good. For example, an approach for adjusting the brightness in an area of a subject and a background, respectively to correct the influence by a backlight has been devised.

A view-monitor system has been devised and implemented, which photographs a circumstance outside a vehicle, a blind spot of a driver, with a camera apparatus mounted in the vehicle and displays it on a monitor inside the vehicle. Since the purpose of such a view-monitor system is that a driver may understand a circumstance outside a vehicle, a blind spot of a driver, it is preferable to be able to visually recognize well a whole image photographed by a camera apparatus mounted as capable to photograph an area of a blind spot. That is, in such a view-monitor system mounted in a vehicle and others, since an area to keep an eye on is different according to a circumstance, it is preferable that the brightness of a photographed image be uniform as a whole regardless of the distinction such as a subject and a background.

Thus, while the influence by a backlight, for example, has been produced in an image photographed by such a view-monitor system, and the brightness is adjusted in an area of a subject and a background, respectively like the above backlight correction, the image required for the system can not be obtained.

Japanese Patent Laid-Open No. 2000-069354 discloses an approach which corrects the brightness of a photographed image to be uniform as a whole regardless of the distinction such as a subject and a background by adjusting an exposure time of a camera apparatus.

SUMMARY OF THE INVENTION

However, since the approach disclosed by Japanese Patent Laid-Open No. 2000-069354 needs three kinds of image signals with different exposure times, the scale of circuit is increased, and also, since the correction processing must be executed by using image signals with the different timings to be photographed, the time lags are produced in the image.

Thus, if the above approach is, for example, applied to such a system that an image having movements is photographed like the view-monitor system mounted in a vehicle, etc. and needs to be provided almost in real-time, there is a problem that the approach is useless.

Therefore, the present invention is proposed considering the above fact, and the object of the present invention is to provide an image processing apparatus and an image processing method which can execute a correction processing with a very simple calculation method so that the brightness of a photographed image has a roughly uniform distribution as a whole.

The image processing apparatus of the present invention solves the above problem by including a image area setting unit which causes each pixel included in a photographed photograph-image to be a correction target pixel in order, and sets an image area including the correction target pixel and plural pixels existing near the correction target pixel, a prescribed value calculation unit which calculates a prescribed value based on brightness information of pixels included in the image area for every image area set by the image area setting unit, a correction value calculation unit which divides a brightness target value of the whole photograph-image by the prescribed value calculated by the prescribed value calculation unit to calculate a correction value, and a correction processing unit which multiplies the brightness information of the correction target pixel of the image area by the correction value calculated by the correction value calculation unit to execute a brightness correction processing.

The image processing method of the present invention solves the above problem by including an image area setting step which causes each pixel included in a photographed photograph-image to be a correction target pixel in order, and sets an image area including the correction target pixel and plural pixels existing near the correction target pixel, a prescribed value calculation step which calculates a prescribed value based on brightness information of pixels included in the image area for every image area set by the image area setting step, a correction value calculation step which divides a brightness target value of the whole photograph-image by the prescribed value calculated by the prescribed value calculation step to calculate a correction value, and a correction processing step which multiplies the brightness information of the correction target pixel of the image area by the correction value calculated by the correction value calculation step to execute a brightness correction processing.

According to the present invention, it is possible to greatly shorten the calculation processing time with the very simple calculation approach, and execute the correction processing so that the brightness of a photographed image has a roughly uniform distribution as a whole keeping the difference of the brightness of an original image around the neighborhood areas.

Thereby, since the extreme contrast difference can be decreased, it is possible to correct the brightness so as to visually recognize well even if the glance is directed to any portion of a whole image.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIGS. 5A, 5B, 5C are a diagram illustrating an image area set for a pixel existing at a surrounding edge of one frame of an image;

DETAILED DESCRIPTION OF THE PREFERRED EMBODIMENTS

An embodiment of the present invention will be described below according to the drawings.

[A configuration of the Image Processing System]

First, an image processing system illustrated as an embodiment of the present invention will be described by using FIG. 1. The image processing system includes a camera apparatus 10, an image processing apparatus 20, and a liquid crystal display 30. This image processing system is, for example, mounted on a vehicle, etc, and is applied to a view-monitor system, etc, which photographs and displays a circumstance outside a vehicle, a blind spot of a driver.

The camera apparatus 10 refers to a photograph apparatus using solid state image sensors such as, for example, CCD (Charge Coupled Device) and CMOS (Complementary Metal Oxide Semiconductor). When the image processing system is applied to the view-monitor system mounted in a vehicle, the camera apparatus 10 is installed at such a location that the area, a blind spot for a driver existing in the vehicle, is able to be photographed. A dynamic image or a still image photographed by the camera apparatus 10 (hereinafter, when dynamic image and still image are generally called, it is referred to as image) is outputted as electric signals to the image processing apparatus 20 of the subsequent stage.

The electric signals outputted from the camera apparatus 10 is inputted to the image processing apparatus 20, and the image processing apparatus 20 executes a prescribed image processing. The image processing apparatus 20 converts the inputted electric signals to the digital data (image data) in A/D conversion, and executes the prescribed image processing for the image data temporarily stored in an image memory 21.

Figure 1:
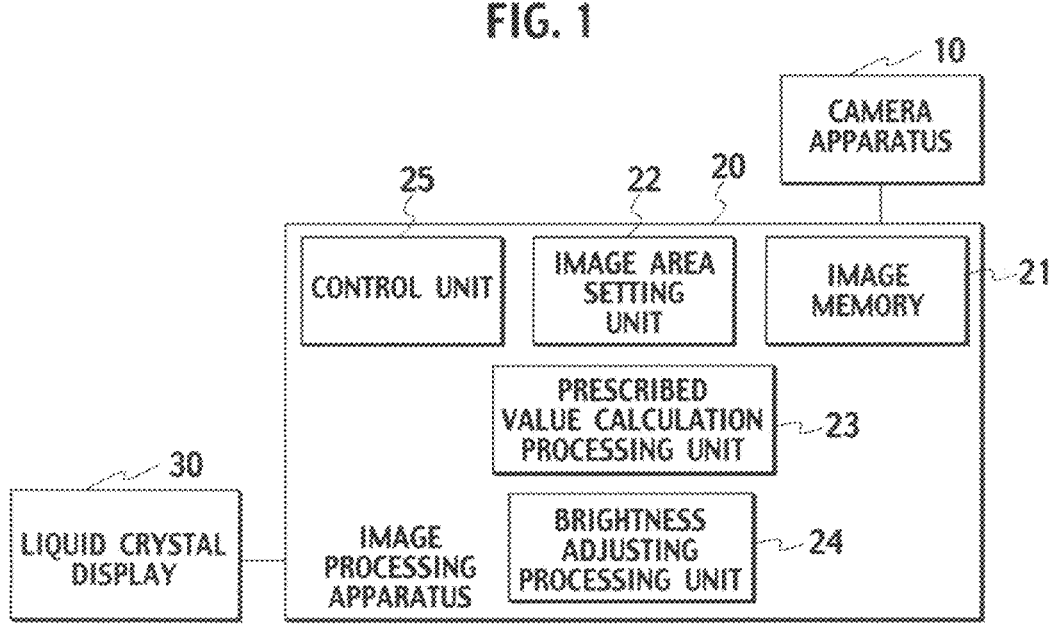
FIG. 1 is a diagram illustrating a configuration of an image processing system according to an embodiment of the present invention.

AS illustrated in FIG. 1, the image processing apparatus 20 includes the image memory 21, an image area setting unit 22, a prescribed value calculation processing unit 23, a brightness adjusting processing unit 24, and a control unit 25, and mainly executes a correction processing for the brightness information of the image data stored in the image memory 21.

The image area setting unit 22 causes each pixel included in the photograph-image (original image) photographed by the camera apparatus 10 to be a correction target pixel in order, and sets an image area which is a partial area of the photograph-image including the correction target pixel. The image area set by the image area setting unit 22 is, for example, a rectangular area, etc. including plural pixels which exist in a surrounding area whose center is the correction target pixel.

Specifically, the image area setting unit 22 selects each pixel data of one frame of image data stored in the image memory 21 as a correction target pixel data in order, and determines an image area set from a coordinate position in the frame of this correction target pixel data.

The prescribed value calculation processing unit 23 calculates a prescribed value based on the brightness information of the pixel included in the image area for every image area set by the image area setting unit 22. The prescribed value calculated by the prescribed value calculation processing unit 23 is, for example, an average value of the brightness information of all the pixels included in the set image area.

Specifically, the prescribed value calculation processing unit 23 reads the brightness information of the pixel data existing in the set image area from the image memory 21, and calculates the prescribed value.

The brightness adjusting processing unit 24 divides a target value of the brightness of the preset whole photograph-image by the prescribed value calculated by the prescribed value calculation processing unit 23 to calculate a correction value, and multiplies the brightness information of the correction target pixel by the calculated correction value to execute the brightness correction processing.

Specifically, the brightness adjusting processing unit 24 reads the brightness target value stored as a default data in ROM (Read Only Memory), not illustrated, etc. and divides it by the prescribed value calculated by the prescribed value calculation processing unit 23 to calculate the correction value. The brightness adjusting processing unit 24 multiplies the correction target pixel data of one frame of image data stored in the image memory,21 by the calculated correction value.

Such image area setting unit 22, prescribed value calculation processing unit 23, and brightness adjusting processing unit 24 may be realized by integrated circuits designed for a specific application such as, for example, ASIC (Application Specific Integrated Circuit) and FPGA (Field Programmable Gate Array). And, the image processing apparatus 20 may be caused to realize the functions of the image area setting unit 22, the prescribed value calculation processing unit 23, and the brightness adjusting processing unit 24 by executing a program stored in a memory, not illustrated.

The image processing apparatus 20 includes also other image processing function than the image area setting unit 22, the prescribed value calculation processing unit 23, and the brightness adjusting processing unit 24. And the image processing function executes such an image processing that an image photographed by the camera apparatus 10 can be visually recognized well through the liquid crystal display 30.

The control unit 25 is a control unit controlling entirely each function executed by the image processing apparatus 20. The correction processing for the brightness information of an image data by the image area setting unit 22, the prescribed value calculation processing unit 23, and the brightness adjusting processing unit 24 is also executed by control of the control unit 25.

The control unit 25 causes the image area setting unit 22, the prescribed value calculation processing unit 23, and the brightness adjusting processing unit 24 to execute the correction processing for the brightness information, and converts the image data after the correction processing to signals which are able to be supplied to the liquid crystal display 30 to execute a display control processing.

The liquid crystal display 30 displays the correction-processed image data as a display image with the display control of the control unit 25. If the image processing system is, for example, mounted in a vehicle, etc, and is applied to the above view-monitor system, the liquid crystal display 30 is installed as a monitor inside a vehicle at such a location that a driver can visually recognize well.

Figure 2:
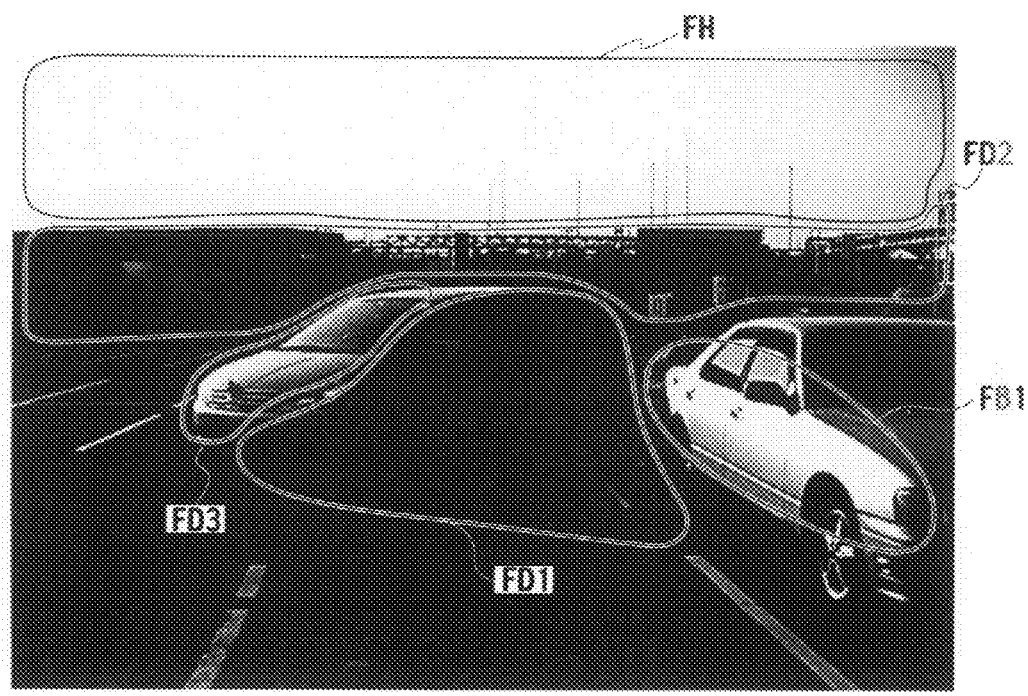
FIG. 2 is a diagram illustrating an example of a photograph-image (original image) which needs the correction of the brightness.

FIG. 2 illustrates an image example which was photographed by the camera apparatus mounted in a vehicle and needs the brightness correction. The example illustrated in FIG. 2 is an image which has, depending on the photograph direction of the camera apparatus for the position of the sunlight, a light source, the extremely high contrast of the brightness, including an area FB1 which is very bright as directly irradiated by the sunlight, areas FD1, FD2 which are very dark in the shadow of a vehicle or a building, and an area FD3 which is slightly dark. It is necessary to correct the brightness because objects in such an image can not be clearly identified.

Therefore, for the image illustrated in FIG. 2, it is assumed to correct the brightness of the photographed image to be uniform as a whole regardless of the distinction such as the subject and the background by adjusting the exposure time of the camera apparatus like the conventional art.

For example, if the exposure time (charge accumulating time) of the solid state image sensors of the camera apparatus is shortened, then enough amount of light can not be obtained. Thus, such a state is produced that the vehicle, etc. in FIG. 2 is filled with black, and it tends to become more difficult to visually identify its existence.

Contrarily, if the exposure time of the solid state image sensors of the camera apparatus is increased, such a state is produced that the area such as the background (e.g. area FH) which has originally enough amount of light in FIG. 2 is filled with white due to the saturation of the amount of light. Therefore, it tends to become very difficult to visually recognize the display image.

The image processing system illustrated as the embodiment of the present invention can correct the brightness of a photographed image to be uniform as a whole regardless of the distinction such as the subject and the background without such black filling and white filling.

[A Brightness Correction Processing Operation of the Image Processing System]

Next, a brightness correction processing operation of the image processing system will be described by using a flowchart illustrated in FIG. 3.

At step S1, the electric signals of the photograph-image photographed by the camera apparatus 10 are converted to an image data in A/D conversion, and it is stored in the image memory 21 of the image processing apparatus 20.

At step S2, the image area setting unit 22 of the image processing apparatus 20 selects each pixel data of one frame of image data stored in the image memory 21 as a correction target pixel data in order, and sets an image area based on the coordinate position in the frame of this correction target pixel data.

Figure 4:
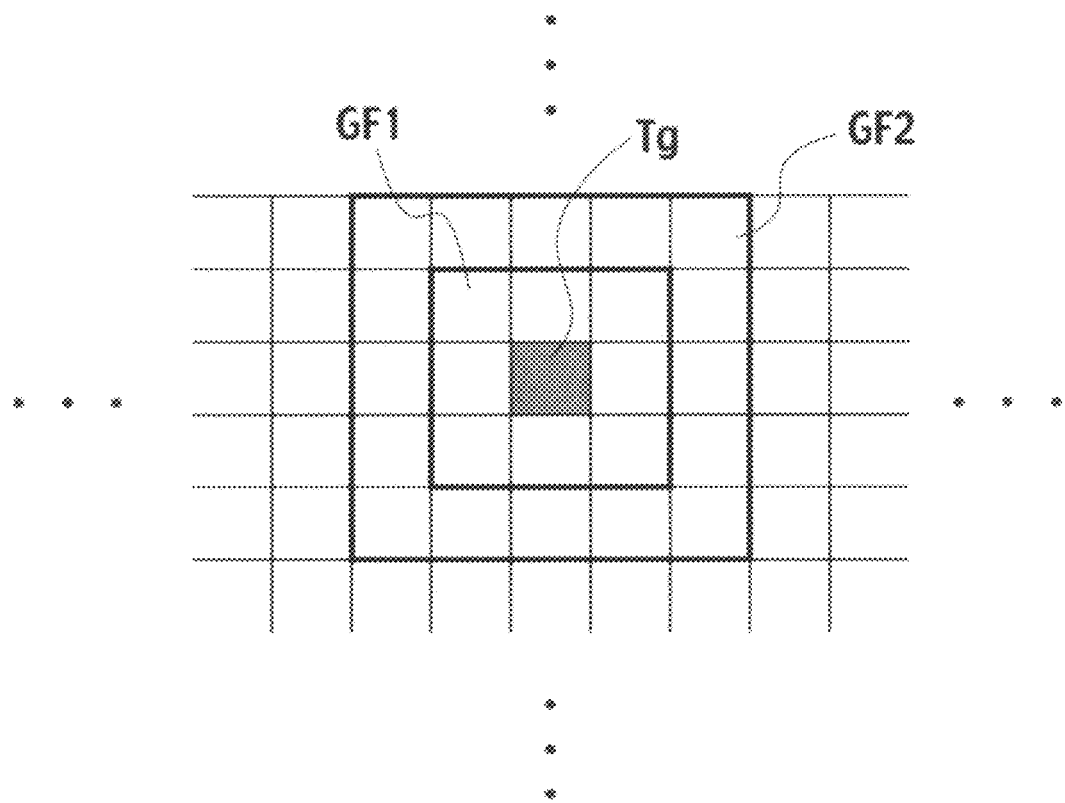
FIG. 4 is a diagram illustrating an image area to be set.

For example, as illustrated in FIG. 4, a correction target pixel Tg is one of the pixels forming an image as arranged in a matrix, and a partial area of the image including this correction target pixel Tg and plural pixels which exist in the surrounding area whose center is the correction target pixel Tg is set as an image area GF1. Meanwhile, the image area setting unit 22 may set, for example, an image area GF2 which is a slightly larger area than the image area GF1 illustrated in FIG. 4, or further larger area as the image area to set.

If a pixel which has pixels in the surrounding area is the correction target pixel like a pixel A illustrated in FIG. 5 (A), the image area setting unit 22 sets a whole image area A1, on the other hand, if a pixel which has pixels only in a part of the surrounding area is the correction target pixel like a pixel B which exists at the edge of the frame, an image area B1 illustrated in FIG. 5 A is not set, and an image area B2 illustrated in FIG. 5B or an image area B3 illustrated in FIG. 5C are set.

The image area B2 illustrated in FIG. 5B is an area in which plural pixels existing in the surrounding area whose center is the correction target pixel are included as many as possible. Therefore, the image area B2 is a smaller area than the image area A1.

On the other hand, the image area B3 illustrated in FIG. 5C is same in the size as the image area A1, in other word, is an area which includes same number of pixels as that of the image area A1. The image area B3 is set by complementing pixels of areas B3a, B3b, and B3c by using the image data stored in the image memory 21. While various approaches may be applied to the approach for complementing pixels of the areas B3a, B3b, and B3c, for example, as illustrated in FIG. 5C, sides of one frame of image are set to a symmetric axis Cx and a symmetric axis Cy, and it is possible to complement with pixels formed in the area by folding back the image in order of the symmetric axis Cy, the symmetric axis Cx. Because the pixel data of the pixels complemented in this way are similar to the pixel data of the neighborhood pixels, it is possible to decrease sense of incongruity with other area than the complemented area.

At step S3, the prescribed value calculation processing unit 23 reads the brightness information from the pixel data stored in the image memory 21 of the pixels existing in the image area set at step S2 to calculate the prescribed value.

For example, an average value Yave of the brightness information of all the pixels in the set image area is set to be the prescribed value. The trend of the brightness near the correction target pixel in the whole image is specified by calculating the average value Yave of the brightness information of all the pixels in the image area like this.

The average value Yave will be used as the prescribed value in the following descriptions.

At step S4, the brightness adjusting processing unit 24 reads a brightness target value Ytarget stored as a default data in ROM, not illustrated, etc., and divides it by the average value Yave calculated at step S3 to calculate a correction value (Ytarget/Yave).

This correction value is, as understood from the formula (Ytarget/Yave), such a magnification ratio that the brightness average value Yave of the image area which is set at step S2 as including the correction target pixel becomes the brightness target value Ytarget.

Furthermore, the brightness adjusting processing unit 24 executes the brightness correction processing by multiplying the brightness information of the correction target pixel by the calculated correction value. The correction-processed image data is stored in the image memory 21.

Thereby, the brightness of the correction target pixel is corrected to be a roughly uniform brightness so that the brightness of the whole image becomes closer to the brightness target value Ytarget, keeping the difference of the brightness of the photograph-image (original image) for the pixels existing near by.

At step S5, the control unit 25 of the image processing apparatus 20 refers to the image data stored in the image memory 21 to decide whether or not the brightness correction processing has been executed as setting every pixel of one frame of photographed image to the correction target pixel. If there is any pixel which has not been set to the correction target pixel, the control unit 25 causes the processing to go back to step S2, and if the correction processing of every pixel has been executed as the correction target pixel, the control unit 25 causes the processing to proceed to step S6.

At step S6, the control unit 25 reads one frame of image data stored in the image memory 21 in order, whose correction processing has been executed, and converts it to the signals which are able to be supplied to the liquid crystal display 30 to cause the liquid crystal display 30 to display it as a display image.

If image data is displayed at the liquid crystal display 30 without the brightness correction processing, the photograph-image photographed by the camera apparatus 10 is displayed as the display image illustrated in FIG. 2. On the other hand, if the processing of steps S1 to S6 of the flowchart described by using FIG. 3 is executed, the display image illustrated in FIG. 6 is displayed through the liquid crystal display 30.

Figure 6:
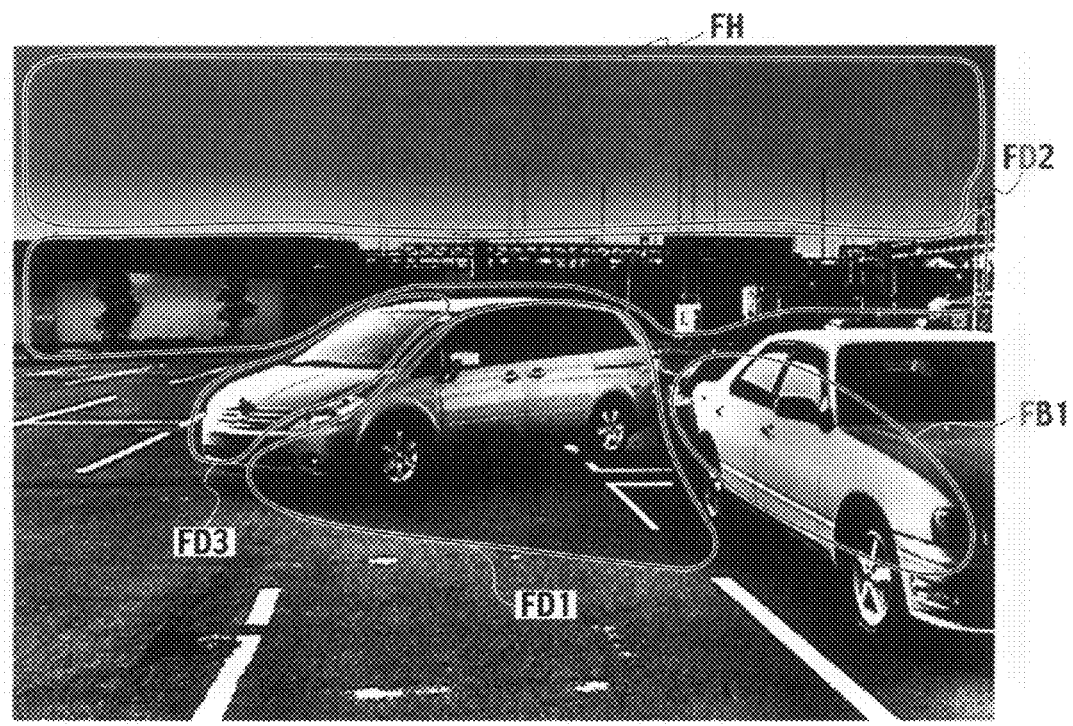
FIG. 6 is a diagram illustrating a result of executing the brightness correction processing based on FIG. 3 for the photograph-image (original image) illustrated in FIG. 2.

As illustrated in FIG. 6, the brightness of the area FB1 which is directly irradiated by the sunlight and is very bright in FIG. 2 is decreased, and the brightness of the areas FD1, FD2 which are very dark in the shadow of a vehicle or a building and the area FD3 which is slightly dark in FIG. 2 is increased. As a result, the contrast of the brightness of the whole image is decreased, and the image has a roughly uniform brightness distribution.

At step S2, while the image area setting 22 selects the pixel data in order as the correction target pixel to set the image area after one frame of image data has been stored in the image memory 21, it may be started to set the image area at the time that the pixel data enough for setting the image area has been stored in the image memory 21. Thereby, it is possible to shorten the calculation processing time in the brightness correction processing.

[A brightness Correction Processing Operation which Further Increases the Visual Recognition]

The area FH illustrated in FIG. 2 and FIG. 6 is the display image of the photographed sky. While the original brightness of the sky is directly reflected in FIG. 2 because the brightness correction processing is not executed, the area FH becomes dark as affected by other areas, and can not keep the original brightness of the sky in FIG. 6 because the correction processing is executed to make a roughly uniform brightness distribution in the whole image. And as illustrated in FIG. 6, the brightness of the area FB1 which should be directly irradiated by the sunlight is also decreased too much to keep the original brightness of the sunlight.

This phenomenon is produced, because the brightness contrast of the photograph-image (original image) is high, and the brightness of the area FH and the area FB1 is much greater than the brightness target value. Therefore, such a brightness correction processing operation will be described using a flowchart illustrated in FIG. 7 that such phenomenon is avoided, and the visual recognition of the display image displayed in the liquid crystal display 30 is further improved.

Figure 3:
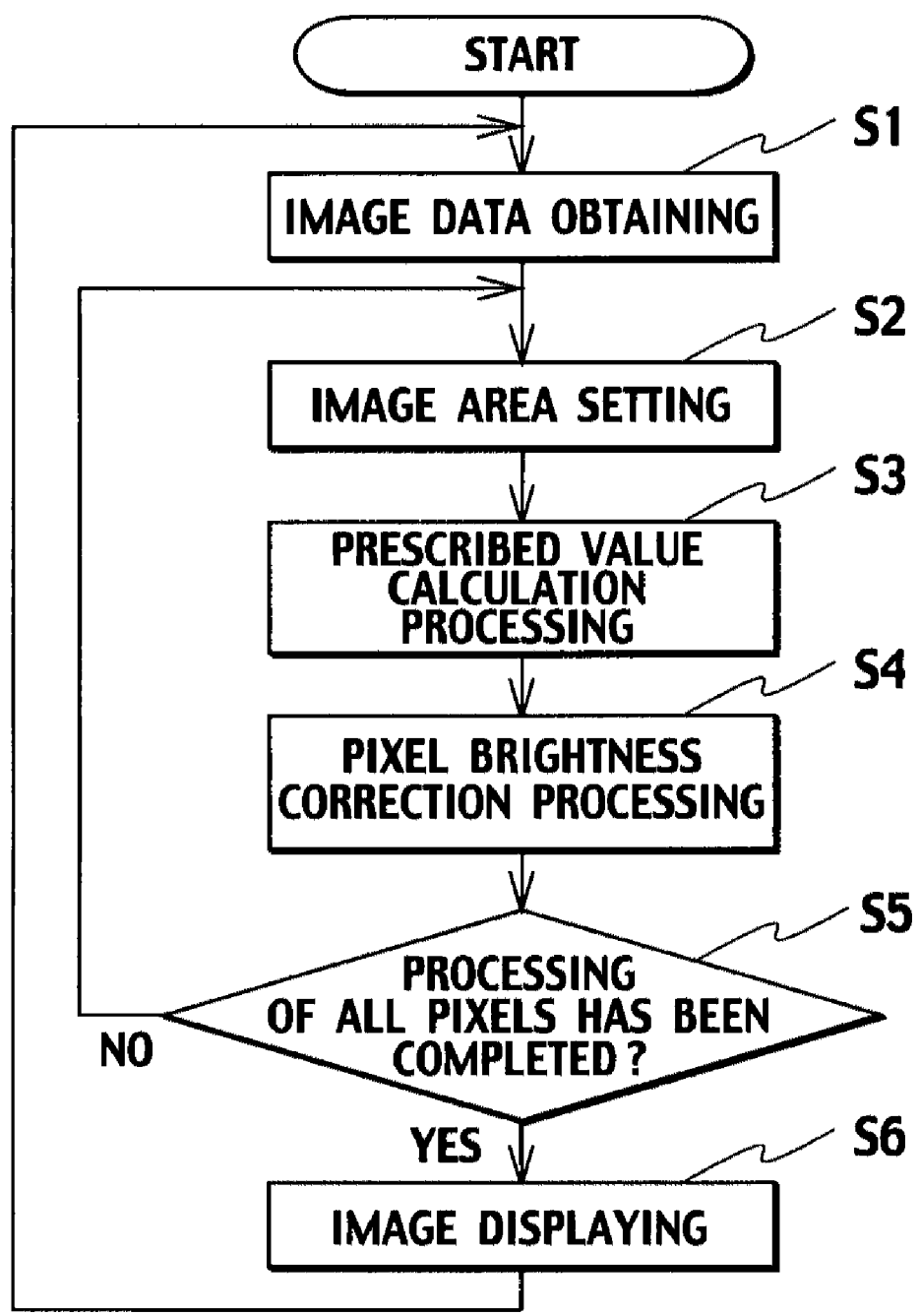
FIG. 3 is a flowchart illustrating a brightness correction processing operation.
Figure 7:
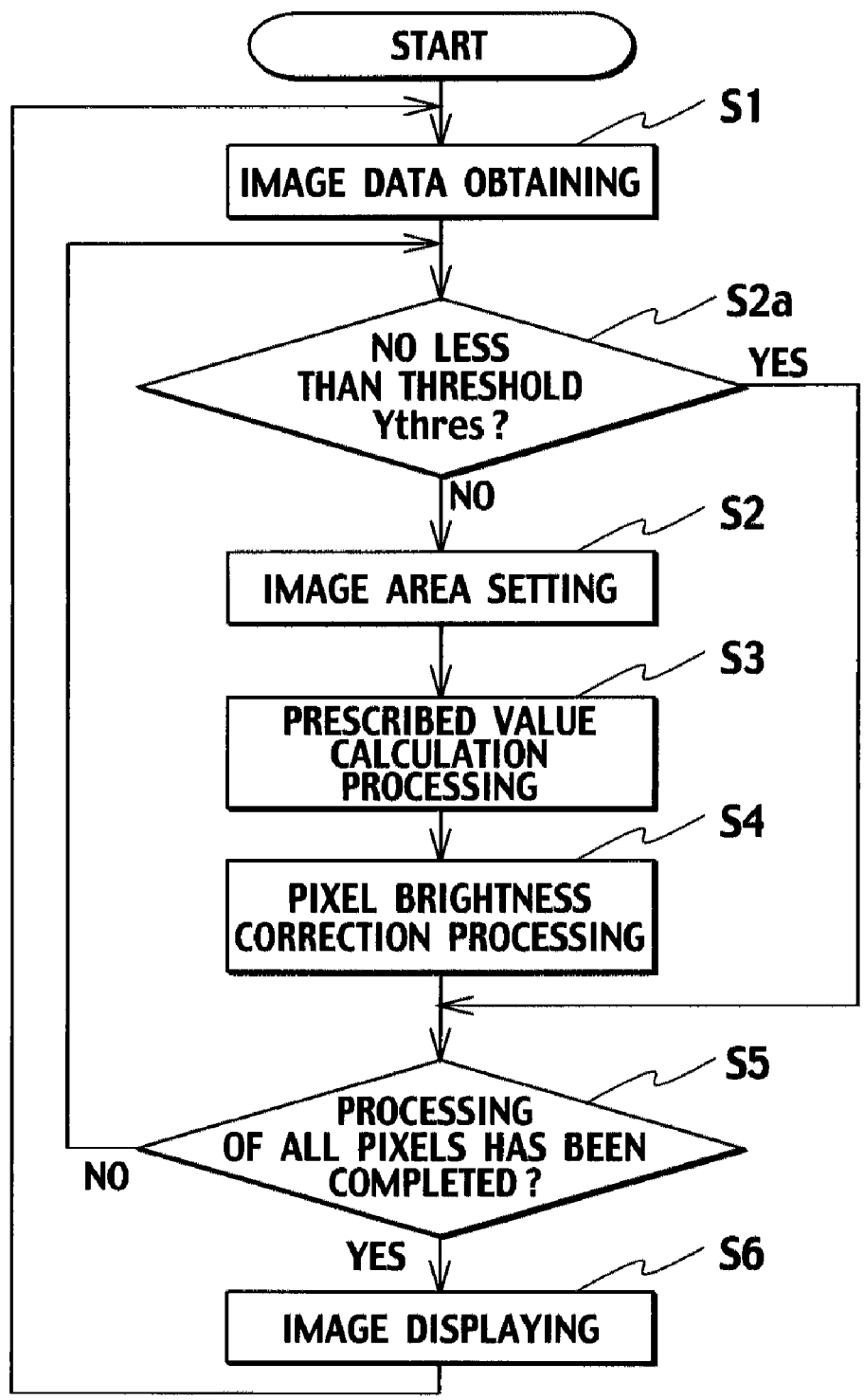
FIG. 7 is a flowchart illustrating a brightness correction processing operation in consideration of an area having brightness which is no less than a threshold.

As illustrated in FIG. 7, the brightness correction processing operation for further improving the visual recognition of the display image has only an additional processing of step S2a between step S1 and step S2 of the flowchart illustrated in FIG. 3. Therefore, the description of the overlapped processing steps is omitted, and only the new additional step S2a will be described.

At step S2a, the control unit 25 compares the brightness information of the pixel data selected as the correction target pixel data by the image area setting unit 22 with a brightness threshold Ythres stored in ROM which is predefined and is not illustrated. This comparison processing by the control unit 25 is executed before the setting processing of the image area is executed by the image area setting unit 22.

If the brightness information of the correction target pixel is no less than the threshold Ythres, the control unit 25 causes the processing to proceed to step S5, and does not execute the brightness correction processing. If it is smaller than the threshold Ythres, the control unit 25 causes the processing to proceed to step S2, and controls to execute the brightness correction processing as described by using the flowchart of FIG. 4.

If image data is displayed at the liquid crystal display 30 without the brightness correction processing, the photograph-image photographed by the camera apparatus 10 is displayed as the display image illustrated in FIG. 2. On the other hand, if the processing of steps S1, S2, and S2a to S6 of the flowchart described by using FIG. 7 is executed, the display image illustrated in FIG. 8 is displayed through the liquid crystal display 30.

Figure 8:
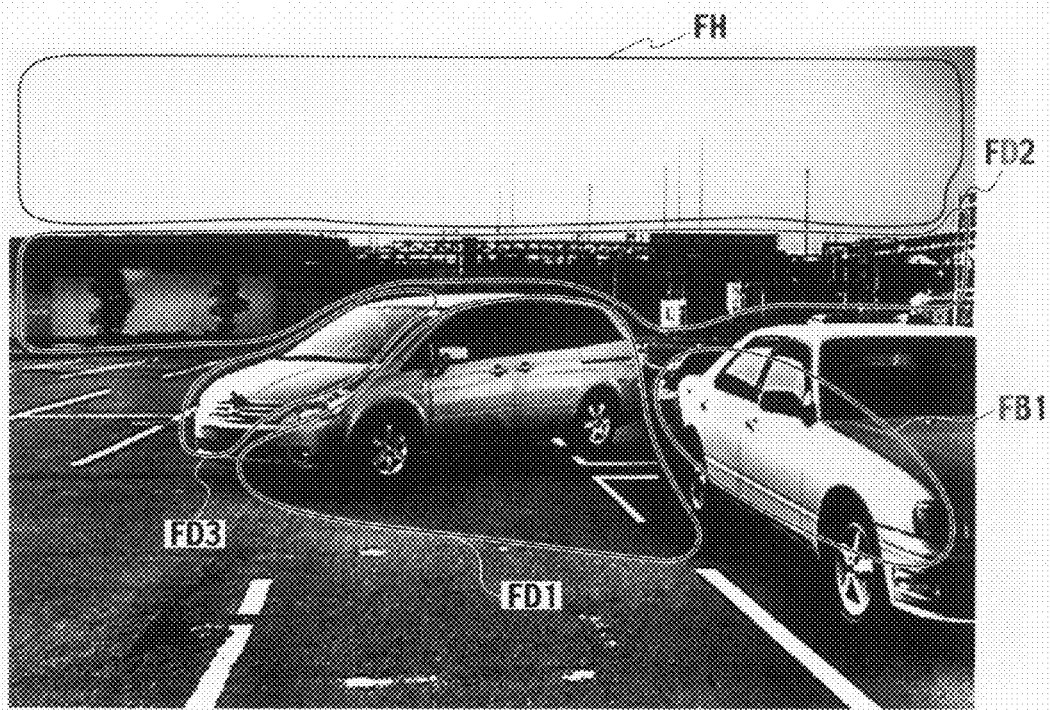
FIG. 8 is a diagram illustrating a result of executing the brightness correction processing based on FIG. 7 for the photograph-image (original image) illustrated in FIG. 2.

As illustrated in FIG. 8, the areas FB1, FH whose brightness is decreased too much in FIG. 6 keep the brightness of FIG. 2 which is the original image, and the areas FD1, FD2 which are very dark in the shadow of a vehicle or a building and the area FD3 which is slightly dark in FIG. 2 are more bright images.

Therefore, as described by using the flowchart illustrated in FIG. 7, if the brightness of the pixel is no less than the threshold Ythres at step S2a, then the image area is not set and the following brightness correction processing is not executed to keep the original brightness, and the image processing system can display the image whose visual recognition is very high through the liquid crystal display 30. That is, the control unit 25 executes the setting processing of the image area by the image area setting unit 22 only if the brightness of the pixel is smaller than the threshold Ythres, and controls so that the following brightness correction processing is executed.

[An Approach for Reducing the Amount of Calculation of the Image Processing]

As described by using FIG. 3, when the brightness is corrected, the image processing apparatus 20 causes the image area setting unit 22 to select each pixel forming an image as the correction target pixel to set the image area, and causes the prescribed value calculation processing unit 23 and the brightness adjusting processing unit 24 to execute the brightness correction processing for each pixel.

In this way, if the brightness correction processing is executed one by one for every pixel, the brightness of the whole image can be corrected to be a roughly uniform brightness so as to become closer to the brightness target value keeping the difference of the brightness of the photograph-image (original image) for the pixels existing near by with a very high degree of accuracy. On the other hand, the processing load of the image processing apparatus 20 tends to increase because the amount of calculation increases.

Therefore, if the correction target is not set for every pixel, and the brightness correction processing is executed for every small area including a number of pixels, the amount of calculation is reduced and the processing load of the image processing apparatus 20 can be decreased.

Figure 9:
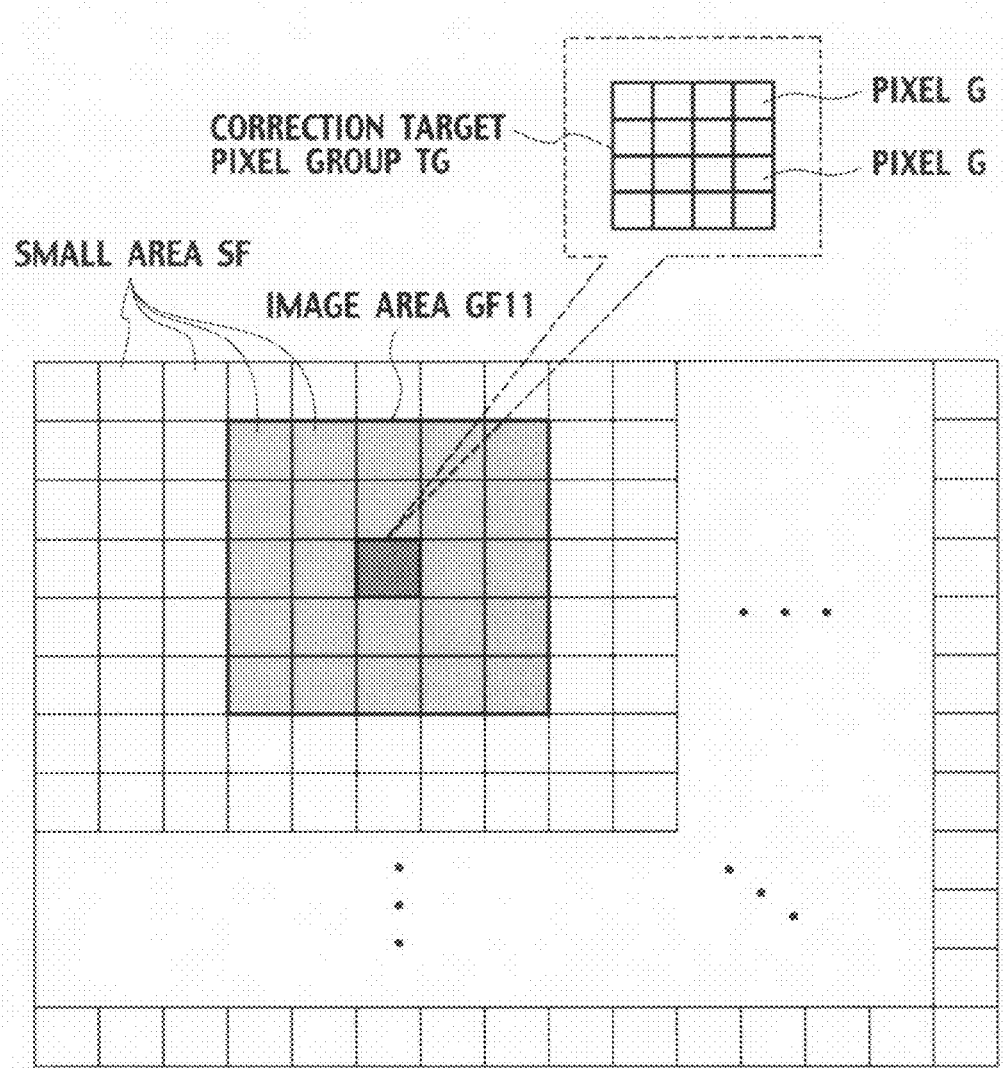
FIG. 9 is a diagram illustrating an image area set so as to reduce the amount of calculation of a brightness correction processing.

Specifically, when setting the image area, the image area setting unit 22, first, divides one frame of image to small areas SF including plural pixels G (4 by 4 in FIG. 9) as illustrated in FIG. 9. The image area setting unit 22 causes a small area SF divided like this to be a correction target pixel group TG, a minimum unit of the correction target, instead of the correction target pixel Tg.

Furthermore, as illustrate in FIG. 9, the image area setting unit 22 sets a partial area of the image including the correction target pixel group TG and plural small areas SF existing in the surrounding area whose center is the correction target pixel group TG as an image area GF1l. The image area setting unit 22 may set, for example, a slightly smaller image area than the image area illustrated in FIG. 9, or further larger image area as the image area to set.

When calculating the prescribed value of the brightness information of the image area G11 set by the image area setting unit 22, the prescribed value calculation processing unit 23, first, determines the brightness information of the small areas SF included in the image area G11. A typical value such as, for example, an intermediate value and an average value of the pixels G included in the small areas SF can be used as the brightness information of the small areas SF.

If the brightness information of the small areas SF included in the image area GF11 is determined in this way, the prescribed value calculation processing unit 23 calculates the prescribed value by obtaining the average value, etc. of the brightness information of the small area SF including the correction target pixel group TG, as in the case that the brightness information is determined for every pixel as described above.

The brightness adjusting processing unit 24 divides the brightness target value which has been previously set of the whole photograph-image by the prescribed value calculated by the prescribed value calculation processing unit 23 to calculate the correction value. The brightness adjusting processing unit 24 multiplies the pixel data included in the correction target pixel group TG of one frame of pixel data stored in the image memory 21 by the calculated correction value.

In this way, if the brightness correction processing is executed for every small area SF divided by the image area setting unit 22, the processing load of the image processing apparatus 20 can be decreased because the amount of calculation is greatly reduced as compared with the case that the brightness correction processing is executed for every pixel.

Figure 10:
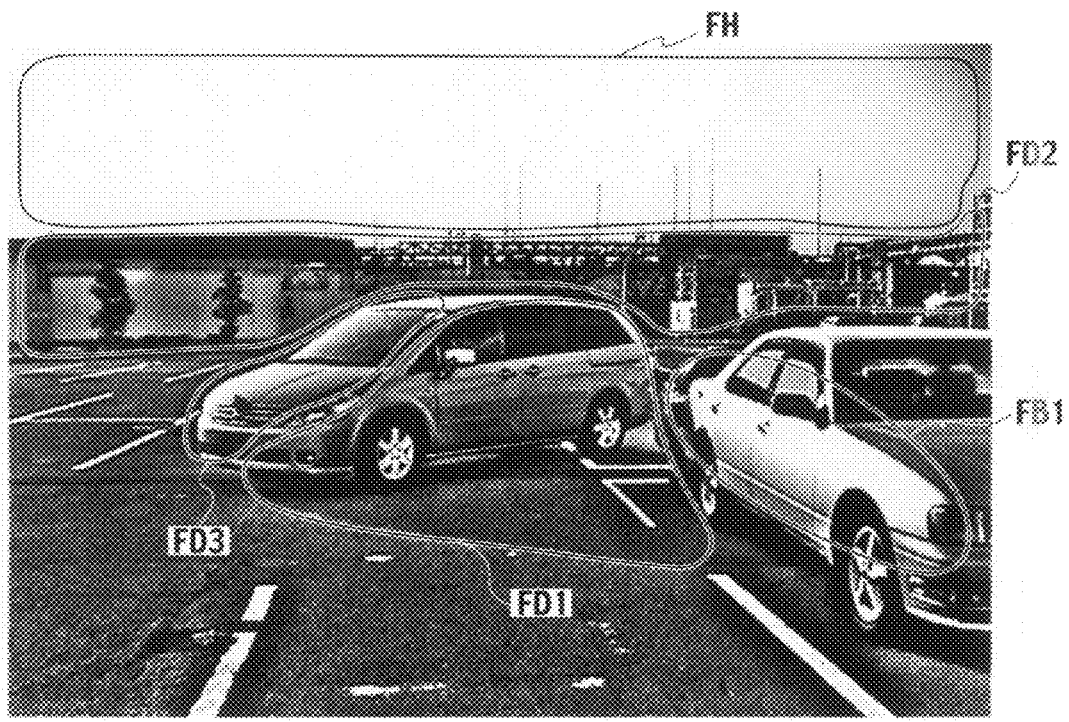
FIG. 10 is a diagram illustrating a result of executing a brightness correction processing in which amount of calculation is reduced for the photograph-image (original image) illustrated in FIG. 2.

In this way, the display image displayed in the liquid crystal display 30 is illustrated in FIG. 10, whose brightness correction processing is executed decreasing the amount of calculation of the image processing apparatus 20. The display image illustrated in FIG. 10 is obtained by executing an algorithm of the flowchart illustrated in FIG. 7. When executing the processing of step S2a illustrated in the flowchart of FIG. 7, the control unit 25 compares the brightness information of the correction target pixel group with the threshold Ythres. A typical value of a pixel included in the correction target pixel group such as, for example, an intermediate value and an average value can be used as the brightness information of the correction target pixel group.

As illustrated in FIG. 10, even if the amount of calculation of the image processing apparatus 20 is reduced, the areas FB1, FH whose brightness is decreased too much in FIG. 6 keep the brightness of FIG. 2 which is the original image, and the areas FD1, FD2 which are very dark in the shadow of a vehicle or a building and the area FD3 which is slightly dark in FIG. 2 become bright, resulting in a good image with high visual recognition.

If the small area SF existing at the surrounding edge of the frame is the correction target pixel group, as described by using FIG. 5, the image area setting unit 22 sets the image area by using the small areas SF existing at a part of the surrounding area of the correction target pixel group, or sets the image area by complementing pixels with a folding back operation.

[An Image Area Setting Approach for Minimizing a Delay Time of the Brightness Correction Processing]

If the brightness correction processing has been executed by the image processing apparatus 20, then the image data after the correction processing is displayed through the liquid crystal display 30 by the display control processing of the control unit 25. The control unit 25 causes the liquid crystal display 30 to display one frame of display image by controlling to scan in a vertical direction repeating a horizontal scanning of a horizontal direction from left to right. According to this, the image data which is written and stored from the camera apparatus 10 to the image memory 21 is also inputted in order of the scanning.

Therefore, the image area which is set for the image target pixel or the image target pixel group is set by the image area setting unit 22 so as to include a lot of image data already inputted and stored in the image memory 21 according to the image data inputted to the image processing apparatus 20 like this.

Figure 11:
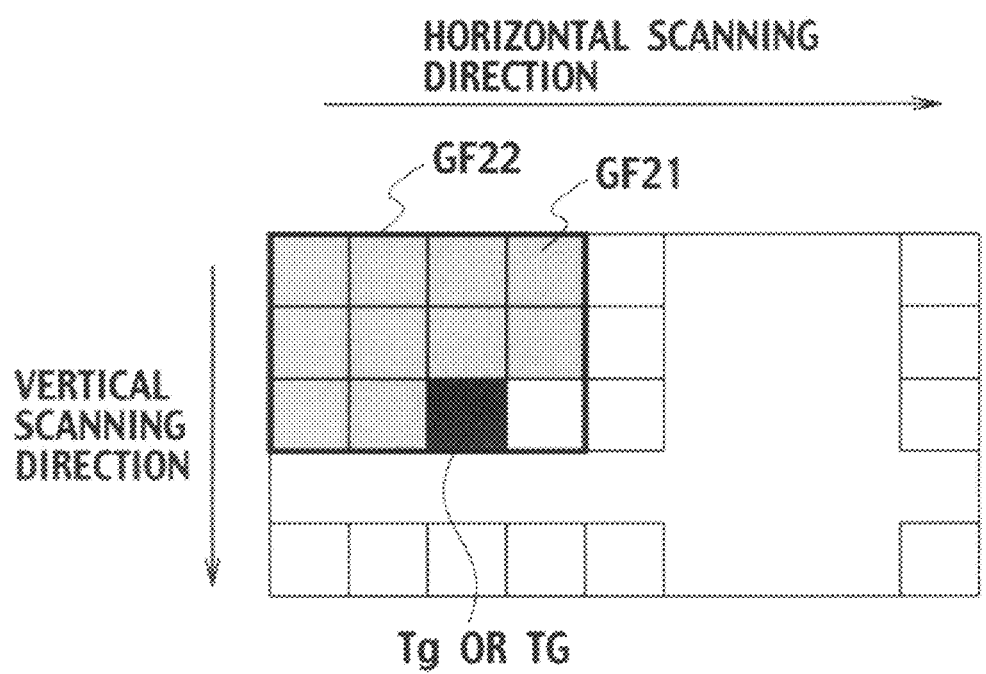
FIG. 11 is a diagram illustrating an approach which shortens time required for a brightness correction processing.

For example, as illustrated in FIG. 11, the image area setting unit 22 causes the newest pixel data of the image data stored in the image memory 21 to be the correction target pixel Tg, or the small area SF including the newest pixel data to be the correction target pixel group TG. Then, as illustrated with slightly dark color in FIG. 11, an image area GF21 is set, which exists in the surrounding area of the correction target pixel Tg or the correction target pixel group TG, and includes the pixel data stored already in the image memory 21. Thereby, the brightness correction processing can be executed in real-time without waiting for one frame of image data to be stored in the image memory 21.

And, the area in the heavy line frame as illustrated in FIG. 11 may be set to an image area GF22, permitting a delay of about one pixel for the correction target pixel Tg, or about one small area for the correction target pixel group TG. In this case also, the brightness correction processing can be executed almost in real-time without waiting for one frame of image data to be stored in the image memory 21.

[Advantages of the Embodiment]

Thereby, the image processing system illustrated as the embodiment of the present invention causes the image processing apparatus 20 to set the image area including the correction target pixel selected as the correction target and the pixels existing in the neighborhood areas of the correction target pixel, calculate the prescribed value based on the brightness information of the pixel included in the image area for every set image area, and multiply the brightness information of the correction target pixel by the correction value which is obtain by dividing the brightness target value of the whole photograph-image by the calculated prescribed value.

Thus, it is possible to execute the correction processing within the calculation processing time which is greatly shortened by the very simple calculation approach so that the brightness of the photographed image has a roughly uniform distribution as a whole keeping the difference of the brightness of the original image in the neighborhood areas.

Thereby, it is possible to correct the brightness so as to visually recognize well even if the glance is directed to any position of the whole image because the extreme contrast difference can be decreased.

And, since it is possible to keep the original brightness of the original image like the sky, and correct the brightness of only the dark area by executing the brightness correction processing only if the brightness of the photographed image is smaller than the prescribed threshold, the image processing apparatus 20 can decrease the sense of incongruity of the display image displayed through the liquid crystal display 30 and increase the visual recognition.

And, since the correction process in which the brightness of the pixels in the neighborhood area is reflected can be executed for he brightness of the correction target pixel by causing the prescribed value calculated by the prescribed value calculation processing unit 23 to be the average value of the brightness information of the pixels in the image area, it is possible to cause the display image displayed through the liquid crystal display 30 to have no sense of incongruity.

And, the image area setting unit 22 can reduce the amount of calculation of the image processing apparatus 20 and decrease the processing load by dividing one frame of image data to the small areas including plural pixels and causing the correction target pixel group selected from the small areas to be the correction target instead of the correction target pixel.

Furthermore, the image area setting unit 22 sets the image area which is set for the correction target pixel or the correction target pixel group so as to include a lot of image data already inputted and stored in the image memory 21 according to the image data inputted to the image processing apparatus 20. Thereby, the brightness correction processing can be executed almost in real-time without waiting for one frame of image data to be stored in the image memory 21, and the calculation processing time can be greatly shortened.

Description has been made of the embodiments to which the invention created by the inventors of the present invention is applied. However, the present invention is not limited to the descriptions and the drawings, which form a part of the disclosure of the present invention according to these embodiments. Specifically, all of other embodiments, examples, operational techniques and the like, which are made by those skilled in the art based on these embodiments, are naturally incorporated in the scope of the present invention. The above is additionally described at the end of this specification.

The entire content of Japanese Patent Application No. TOKUGAN 2006-162443 with a filing date of Jun. 12, 2006 is hereby incorporated by reference.

What is claimed is:

1. An image processing apparatus comprising:
   image area setting means for causing each pixel included in a photographed photograph-image to be a correction target pixel in order, and sets an image area including the correction target pixel and plural pixels existing near the correction target pixel;
   prescribed value calculation means for calculating a prescribed value based on brightness information of pixels included in the image area for every image area set by the image area setting means;
   correction value calculation means for dividing a brightness target value of a whole photograph-image by the prescribed value calculated by the prescribed value calculation means to calculate a correction value; and,
   correction processing means for multiplying the brightness information of the correction target pixel of the image area by the correction value calculated by the correction value calculation means to execute a brightness correction processing,
   wherein if the correction target pixel is a pixel which has pixels only in a part of a surrounding area, the image area setting means sets sides of the photographed photograph-image to a symmetric axis, and complements pixels in an other part of the surrounding area with pixels-formed in the area by folding back the photographed photograph-image in order of the symmetric axis.

2. An image processing apparatus comprising:
   an image area setting unit which causes each pixel included in a photographed photograph-image to be a correction target pixel in order, and sets an image area including the correction target pixel and plural pixels existing near the correction target pixel;
   a prescribed value calculation unit which calculates a prescribed value based on brightness information of pixels included in the image area for every image area set by the image area setting unit;
   a correction value calculation unit which divides a brightness target value of a whole photograph-image by the prescribed value calculated by the prescribed value calculation unit to calculate a correction value; and,
   a correction processing unit which multiplies the brightness information of the correction target pixel of the image area by the correction value calculated by the correction value calculation unit to execute a brightness correction processing,
   wherein if the correction target pixel is a pixel which has pixels only in a part of a surrounding area, the image area setting unit sets sides of the photographed photograph-image to a symmetric axis, and complements pixels in an other part of the surrounding area with pixels formed in the area by folding back the photographed photograph-image in order of the symmetric axis, and
   at least one of the image area setting unit, the prescribed value calculation unit, the correction value calculation unit, and the correction processing unit is realized by an integrated circuit.

3. The image processing apparatus according to claim 2, wherein if the brightness information of the correction target pixel is smaller than a prescribed threshold, the image area setting unit sets the image area including the correction target pixel and the plural pixels existing near the correction target pixel.

4. The image processing apparatus according to claim 2, wherein:
   the image area setting unit sets-an area including the correction target pixel and the plural pixels existing in the surrounding area, a center of which is the correction target pixel, as the image area; and,
   the prescribed value calculation unit calculates an average value of the brightness information of all pixels included in the image area to cause the average value to be the prescribed value.

5. The image processing apparatus according to claim 3, wherein:
   the image area setting unit sets an area including the correction target pixel and the plural pixels existing in the surrounding area, center of which is the correction target pixel, as the image area; and,
   the prescribed value calculation unit calculates an average value of the brightness information of all pixels included in the image area to cause the average value to be the prescribed value.

6. The image processing apparatus according to claim 2, wherein the image area setting unit causes a pixel corresponding to a newest pixel data of the photograph-image inputted to the image processing apparatus to be the correction target pixel, and sets the image area so as to include many pixels corresponding to the pixel data inputted already.

7. The image processing apparatus according to claim 3, wherein the image area setting unit causes a pixel corresponding to newest pixel data of the photograph-image inputted to the image processing apparatus to be the correction target pixel, and sets the image area so as to include many pixels corresponding to the pixel data inputted already.

8. The image processing apparatus according to claim 4, wherein the image area setting unit causes a pixel corresponding to a newest pixel data of the photograph-image inputted to the image processing apparatus to be the correction target pixel, and sets the image area so as to include many pixels corresponding to the pixel data inputted already.

9. The image processing apparatus according to claim 5, wherein the image area setting unit causes a pixel corresponding to a newest pixel data of the photograph-image inputted to the image processing apparatus to be the correction target pixel, and sets the image area so as to include, many pixels corresponding to the pixel data inputted already.

10. The image processing apparatus according to claim 2, wherein:
the image area setting unit divides the photographed photograph-image to small areas including plural pixels, causes each small area to be a correction target pixel group in order, and sets an area including the correction target pixel group and the plural small areas existing near the correction target pixel group as the image area; and,
the correction processing unit multiplies the brightness information of each pixel included in the correction target pixel group of the image area by the correction value calculated by the correction value calculation unit to execute the brightness correction processing.

11. The image processing apparatus according to claim 10, wherein if the brightness information of the correction target pixel group is smaller than a prescribed threshold, the image area setting unit sets the image area including the correction target pixel group and the plural small areas existing near the correction target pixel group.

12. The image processing apparatus according to claim 10, wherein:
the image area setting unit sets an area including the correction target pixel group and the plural small areas existing in surrounding area, center of which is the correction target pixel group, as the image area; and,
the prescribed value calculation unit calculates an average value of the brightness information of the small areas included in the image area to cause the average value to be the prescribed value.

13. The image processing apparatus according to claim 11, wherein:
the image area setting unit sets an area including the correction target pixel group and the plural small areas existing in a surrounding area, center of which is the correction target pixel group, as the image area; and,
the prescribed value calculation unit calculates an average value of the brightness information of all the small areas included in the image area to cause the average value to be the prescribed value.

14. The image processing apparatus according to claim 10, wherein the image area setting unit causes the small area including a pixel corresponding to a newest pixel data of the photograph-image inputted to the image processing apparatus to be the correction target pixel group, and sets the image area so as to include many small areas including pixels corresponding to the pixel data inputted already.

15. The image processing apparatus according to claim 11, wherein the image area setting unit causes the small area including a pixel corresponding to a newest pixel data of the photograph-image inputted to the image processing apparatus to be the correction target pixel group, and sets the image area so as to include many small areas including pixels corresponding to the pixel data inputted already.

16. The image processing apparatus according to claim 12, wherein the image area setting unit causes the small area including a pixel corresponding to a newest pixel data of the photograph-image inputted to the image processing apparatus to be the correction target pixel group, and sets the image area so as to include many small areas including pixels corresponding to the pixel data inputted already.

17. The image processing apparatus according to claim 13, wherein the image area setting unit causes the small area including a pixel corresponding to a newest pixel data of the photograph-image inputted to the image processing apparatus to be the correction target pixel group, and sets the image area so as to include many small areas including pixels corresponding to the pixel data inputted already.

18. An image processing method comprising:
an image area setting step which causes each pixel included in a photographed photograph-image to be a correction target pixel in order, and sets an image area including the correction target pixel and plural pixels existing near the correction target pixel;
a prescribed value calculation step which calculates a prescribed value based on brightness information of pixels included in the image area for every image area set by the image area setting step;
a correction value calculation step which divides a brightness target value of a whole photograph-image by the prescribed value calculated by the prescribed value calculation step to calculate a correction value; and,
a correction processing step which multiplies the brightness information of the correction target pixel of the image area by the correction value calculated by the correction value calculation step to execute a brightness correction processing,
wherein if the correction target pixel is a pixel which has pixels only in a part of surrounding area, the image area setting step sets sides Of the photographed photograph-image to a symmetric axis, and complements pixels in another part of the surrounding area with pixels formed in the area by folding back the photographed photograph-image in order of the symmetric axis.

* * * * *